Figure 1:
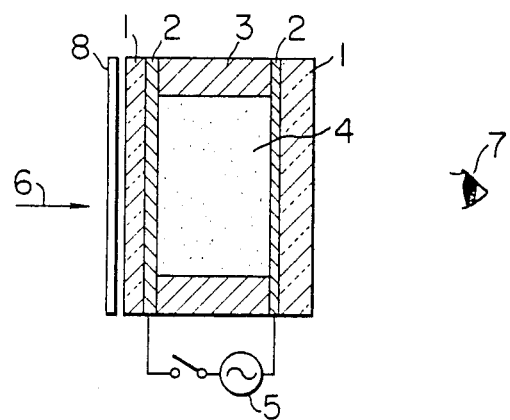

United States Patent [19]

Shimidzu et al.

[11] Patent Number: 4,632,781
[45] Date of Patent: Dec. 30, 1986

[54] LIQUID CRYSTAL DYE COMPOUND

[75] Inventors: Yasutaka Shimidzu, Toyonaka; Hirohito Kenmochi, Takatsuki; Toshihiko Ueno; Chizuka Tani, both of Tokyo, all of Japan

[73] Assignees: Sumitomo Chemical Company, Limited, Osaka; Nippon Electric Co., Ltd., Tokyo, both of Japan

[21] Appl. No.: 685,536

[22] Filed: Dec. 24, 1984

Related U.S. Application Data

[62] Division of Ser. No. 330,487, Dec. 14, 1981, Pat. No. 4,505,549.

[30] Foreign Application Priority Data

Jan. 12, 1981 [JP]  Japan ........................... 56-3677

[51] Int. Cl.$^4$ .................... C07C 97/26; C07C 96/25
[52] U.S. Cl. .................................. 260/380; 260/381
[58] Field of Search ........................ 260/380, 381, 373

[56] References Cited

U.S. PATENT DOCUMENTS 4,363,743 12/1982 Moeller et al. ..................... 260/380

Primary Examiner—Glennon H. Hollrah
Assistant Examiner—Raymond Covington
Attorney, Agent, or Firm—Stevens, Davis, Miller & Mosher

[57] ABSTRACT

A liquid crystal display device comprising a liquid crystal composition filled between one pair of electrode substrates at least one of which is transparent, said liquid crystal composition containing one or more blue dye(s) represented by the following general formula:

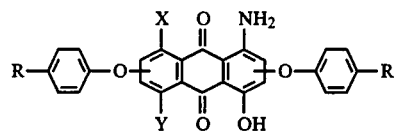

wherein one of X and Y is amino group and the other is hydroxyl group; and R is alkyl group, alkoxy group, alkylthio group, aryl group, aralkyl group, aryloxy group, arylthio group, aralkyloxy group, aralkylthio group, halogen atom, piperidino group, piperazino group, morpholino group, pyrrolidino group or a group

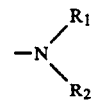

in which $R_1$ and $R_2$ are hydrogen atom, alkyl group, aryl group or aralkyl group; provided that the alkyl chain and the aryl ring in substituents R, $R_1$ and $R_2$ may optionally be substituted.

4 Claims, 2 Drawing Figures

LIQUID CRYSTAL DYE COMPOUND

This is a continuation of application Ser. No. 330,487 filed Dec. 14, 1981, now U.S. Pat. No. 4,505,549.

This invention relates to a liquid crystal display device characterized by using a liquid crystal composition containing a dichroic dye.

Today, there are commercially available portable computers, watches and the like which use a twisted nematic type liquid crystal display device. However, those in which a twisted nematic type liquid crystal display device is used have the following faults: (1) because of the use of a polarizer, they belong to reflection type utilizing the ambient light so that, when they are used as a color display with a color polarizer, the display is dark, and (2) the angle of vision is narrow.

On the other hand, the guest-host effect type display devices in which a dichroic dye is added to liquid crystal are characterized in that (1) they do not always necessitate a polarizer so that a reflection type color display of high brightness can be made, (2) they are rich in the variety of displayed color depending on the selection of dye added and (3) they give a wide angle of vision. Furthermore, if made into an internal illumination type (transmission type) of device by using a polarizer, they can give a display of higher brightness and higher contrast. Accordingly, they are display devices adaptable to the diversity required in the current market. However, the hitherto known guest-host effect type liquid crystal display devices cannot sufficiently satisfy the requirements of contrast and lifetime simultaneously. This is for the reason that the hitherto known dichroic dyes have no simultaneous excellence in dichroism and light stability. As the representatives of hitherto known dichroic dyes, azo type and anthraquinone type of dyes can be mainly referred to. Among them, azo types generally have a dichroic ratio of 8–10 and a light-stability of several thousand hours, so that they are in general high in dichroic ratio and poor in light-stability. On the other hand, anthraquinone type of ones generally have a dichroic ratio of 6–9 and a light-stability of several ten thousand hours, so that they are low in dichroic ratio though they are sufficient in light-stability.

The present inventors conducted a study on the dye for use in the above-mentioned display device utilizing guest-host effect to find out a dye excellent in both dichroic ratio and light-stability. This invention was accomplished on the basis of this finding.

It is an object of this invention to provide a guest-host effect type liquid crystal display device of high contrast and long lifetime in which is used a dichroic dye excellent in both dichroism and light-stability.

Objects and advantages of this invention will become apparent from the description given below.

According to this invention, there is provided a liquid crystal display device comprising a liquid crystal composition filled between one pair of electrode substrates at least one of which is transparent, said liquid crystal composition containing one or more blue dye(s) represented by the following general formula (I):

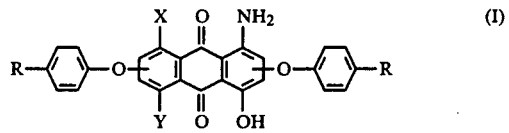

wherein one of X and Y is amino group and the other is hydroxyl group; and R is alkyl group, alkoxy group, alkylthio group, aryl group, aralkyl group, aryloxy group, arylthio group, aralkyloxy group, aralkylthio group, halogen atom, piperidino group, piperazino group, morpholino group, pyrrolidino group or a group

in which $R_1$ and $R_2$ are hydrogen atom, alkyl group, aryl group or aralkyl group; provided that the alkyl chain and the aryl ring in said substituents R, $R_1$ and $R_2$ may optionally be substituted.

As typical concrete examples of R in general formula (I), there can be referred to straight and branched chain alkyl groups such as methyl, ethyl, propyl, butyl, amyl, hexyl, octyl, nonyl, dodecyl, methoxypropyl, ethoxyethyl, propoxyethyl, hexyloxyethyl, ethoxyethoxyethyl and the like; straight and branched chain alkoxy groups such as methoxy, ethoxy, propoxy, butoxy, amyloxy, hexyloxy and the like; alkylthio groups such as ethylthio, propylthio, butylthio, hexylthio and the like; aryl groups such as phenyl, p-propylphenyl, p-butylphenyl, p-hexylphenyl, p-ethoxyphenyl, p-butoxyphenyl and the like; aralkyl groups such as benzyl, p-butylbenzyl and the like; aryloxy groups such as phenoxy, p-butylphenoxy, p-butoxyphenoxy and the like; arylthio groups such as phenylthio, p-butylphenylthio and the like; aralkyloxy groups such as benzyloxy, p-butylbenzyloxy, p-butylphenethyloxy and the like; aralkylthio groups such as p-hexylbenzylthio, p-propylphenethylthio and the like; halogen atoms such as chlorine, bromine and the like; amino groups such as diethylamino, bisethoxyethylamino, p-butylanilino, anilino, N-methyl-p-hexylbenzylamino and the like; piperidino group; piperazino group; morpholino group; pyrrolidino group; and the like.

The dyes used in this invention are generally synthesized in the following manner.

The following compound (II) is reacted with a phenol derivative represented by the following general formula (III) in the presence of a deacidifying agent to synthesize a blue dye represented by the general formula (I).

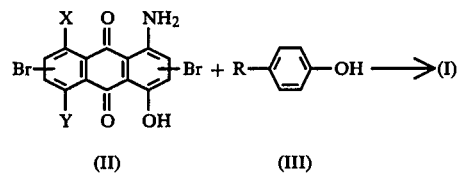

wherein X, Y and R are as defined above.

The typical dyes obtained in this manner and their dichroic ratios in liquid crystal are shown in Table 1.

The characteristics shown in the table are values obtained when E 8 (BDH Chemicals) consisting of 43% of 4-cyano-4'-n-pentylbiphenyl, 17% of 4-cyano-4'-n-propoxybiphenyl, 13% of 4-cyano-4'-n-pentoxybiphenyl, 17% of 4-cyano-4'-n-octoxybiphenyl and 10% of 4-cyano-4'-n-pentylterphenyl is used as said liquid crystal.

TABLE 1

| No. | Position of substituent NH$_2$ | OH | $-O-\text{C}_6\text{H}_4-R$ | R | Dichroic ratio |
|---|---|---|---|---|---|
| 1 | 1,5 | 4,8 | 3,7 | $-CH_2CH_2CH_2CH_3$ | 12.4 |
| 2 | 1,5 | 4,8 | 3,7 | $-C_9H_{19}$ *[1] | 10.1 |
| 3 | 1,8 | 4,5 | 3,6 | $-CH_2CH_3$ | 11.8 |
| 4 | 1,8 | 4,5 | 2,6 | $-O-CH_2CH_2CH_2CH_3$ | 12.3 |
| 5 | 1,5 | 4,8 | 2,6 | $-CH_2CH_2CH_2CH_3$ | 12.2 |
| 6 | 1,5 | 4,8 | 2,7 | —C$_6$H$_5$ | 12.3 |
| 7 | 1,5 | 4,8 | 3,7 | $-CH_2-$C$_6$H$_5$ | 11.9 |
| 8 | 1,5 | 4,8 | 2,6 | $-NH-$C$_6$H$_5$ | 12.2 |
| 9 | 1,8 | 4,5 | 2,7 | $-CH_2CH_2CH_2CH_2CH_3$ | 12.1 |
| 10 | 1,8 | 4,5 | 2,7 | $-N(CH_2CH_3)_2$ | 11.6 |
| 11 | 1,8 | 4,5 | 3,6 | —C$_6$H$_5$ | 11.9 |
| 12 | 1,8 | 4,5 | 2,6 | $-CH_2CH_2CH_3$ | 12.0 |
| 13 | 1,5 | 4,8 | 3,7 | $-O-$C$_6$H$_5$ | 12.1 |
| 14 | 1,5 | 4,8 | 3,7 | $-S-CH_2CH_2CH_3$ | 12.2 |
| 15 | 1,5 | 4,8 | 3,7 | $-O-CH_2-$C$_6$H$_5$ | 12.0 |
| 16 | 1,5 | 4,8 | 3,7 | —N(piperidine) | 12.3 |
| 17 | 1,5 | 4,8 | 2,7 | —N(morpholine) | 12.0 |
| 18 | 1,8 | 4,5 | 3,6 | —N(pyrrolidine) | 12.4 |

TABLE 1-continued

| No. | NH₂ | OH | $-O-\phenyl-R$ position | R | Dichroic ratio |
|---|---|---|---|---|---|
| 19 | 1,8 | 4,5 | 2,7 | —N(CH₂CH₂)₂NH (piperazinyl) | 12.0 |
| 20 | 1,5 | 4,8 | 3,7 | —CH₃ | 11.8 |
| 21 | 1,5 | 4,8 | 2,7 | —CH₂CH₂CH₂CH₃ | 12.1 |
| 22 | 1,5 | 4,8 | 3,7 | —CH₂CH₃ | 11.9 |
| 23 | 1,8 | 4,5 | 2,6 | —CH₂CH₂CH₂CH₃ | 12.0 |
| 24 | 1,8 | 4,5 | 3,6 | —(CH₂)₈CH₃ | 12.5 |
| 25 | 1,8 | 4,5 | 2,7 | —CH₂CH₂CH₂CH₃ | |
| 26 | 1,8 | 4,5 | 3,6 | —CH₂CH₂CH₂CH₃ | 12.2 |
| 27 | 1,5 | 4,8 | 3,7 | —C₆H₄—CH₂CH₂CH₂CH₃ | 12.3 |
| 28 | 1,8 | 4,5 | 2,7 | —C₆H₄—O—CH₂CH₂CH₂CH₃ | 12.3 |
| 29 | 1,5 | 4,8 | 3,7 | —CH₂CH₂CH₃ | 12.0 |
| 30 | 1,5 | 4,8 | 2,6 | —Cl | 11.0 |
| 31 | 1,5 | 4,8 | 2,6 | —CH₂CH₂OCH₂CH₃ | 12.1 |
| 32 | 1,8 | 4,5 | 3,6 | —OCH₂CH₂OCH₂CH₃ | 12.2 |
| 33 | 1,8 | 4,5 | 3,6 | —N(CH₂CH₂OCH₃)₂ | 11.8 |
| 34 | 1,5 | 4,8 | 3,7 | —CH₂CH₂CH₂CH₂CH₃ | 12.4 |
| 35 | 1,8 | 4,5 | 3,6 | —S—C₆H₅ | 12.0 |
| 36 | 1,5 | 4,8 | 3,7 | —C₁₂H₂₅ *² | 10.5 |

(Notes)
*¹The nonyl group is a trimer of propylene.
*²The dodecyl group is a tetramer of propylene.

Next, this invention will be illustrated in more detail with reference to drawings.

Figure 2:
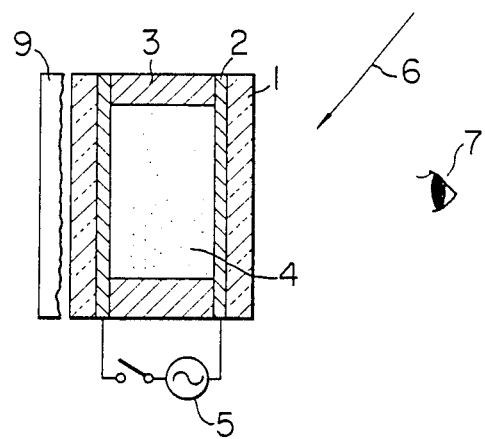

In the drawings attached,

FIG. 1 is an outlined cross-sectional view of a transmission type liquid crystal display device wherein is used the liquid crystal display device of this invention, and FIG. 2 is an outlined cross-sectional view of reflexion type liquid crystal display device according to another example of this invention.

In FIGS. 1 and 2, 1 is transparent glass substrate; 2 is transparent electrode made of, for example, indium oxide which is provided inside the transparent glass substrate; 3 is a spacer made of, for example, teflon film with which the thickness of cell is regulated to about 10–15 μm; 4 is nematic liquid crystal composition containing one or more dichroic dye(s); 5 is electric source for applying voltage to the liquid crystal display device which may be direct current source or alternating current source; 6 is incident light; 7 is the eye of observer; 8 is polarizing plate; and 9 is light diffuse reflector. In this device, the surface of the transparent electrode is treated so as to orient the liquid crystal and the dichroic dye to the direction parallel with the surface of transparent electrode, by the method of rubbing the surface with cotton coth or the like to one direction or by the method of obliquely depositing the vapor of silicon oxide or the like or by some other methods.

As the nematic liquid crystals showing a positive dielectric anistropy usable in this invention, there can be referred to single substances represented by the following general formulas:

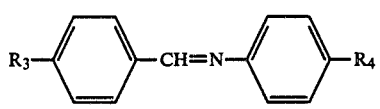

-continued

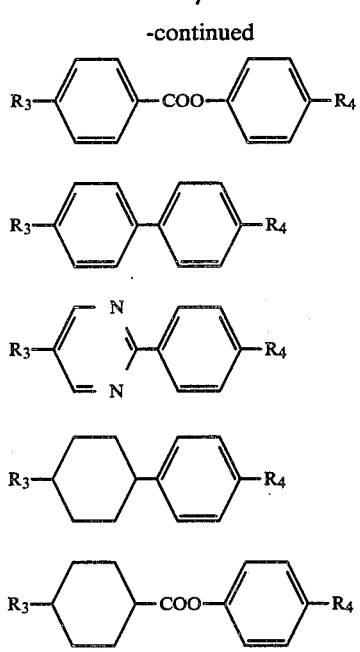

wherein one of $R_3$ and $R_4$ is cyano group and the other is alkyl group, alkoxy group, alkylphenyl group or alkoxyphenyl group, and mixtures of said substances.

Though a transmission type display device is shown in FIG. 1, a reflection type display device shown in FIG. 2 is also usable. In the latter case, a light diffuse reflector 9 is placed behind the panel.

As above, display devices of the type in which color disappears when a voltage is applied are shown here. To the contrary, it is also possible to construct a display device which develops a color when voltage is applied. Such a display device can be constructed by using a nematic liquid crystal exhibiting a negative dielectric anisotropy and treating the surface of the transparent electrode with a surfactant such as N,N-dimethyl-N-octadecyl-3-aminopropyltrimethoxysilyl chloride, dimethyldichlorosilane, methyltrichlorosilane or the like, or by mixing an orienting agent such as cetyltrimethylammonium fluoride or the like into the liquid crystal and orienting the liquid crystal and the dichroic dye perpendicularly to the surface of transparent electrode.

Further, if a small quantity of cholesteric liquid crystal is mixed into nematic liquid crystal, there is obtained a display device worked by the so-called phase transition type (it is called White-Taylor type, too) guest-host effect. Even if used as a reflection type of device, it gives a high contrast without the necessity of a polarizer.

Next, this invention will be illustrated in more detail with reference to Examples which are presented in no limitative way.

EXAMPLE 1

A liquid crystal composition was prepared by dissolving 1% of dye No. 1 shown in the above-mentioned table into a liquid crystal mixture (E 8, BDH Chemicals) consisting of 43% of 4-cyano-4'-n-pentylbiphenyl, 17% of 4-cyano-4'-n-propoxybiphenyl, 13% of 4-cyano-4'-n-pentoxybiphenyl, 17% of 4-cyano-4'-n-octoxybiphenyl and 10% of 4-cyano-4'-n-pentylterphenyl. The liquid crystal composition thus obtained was introduced into a liquid crystal cell which had been treated so that the liquid crystal and the dichroic dye became parallel with the transparent electrode. In the construction of FIG. 1, the blue-colored liquid crystal cell turned substantially colorless when a voltage of about 6 volts was applied to the liquid crystal cell.

In this liquid crystal cell, the dye showed $\lambda_{max}$ of 572 nm and 612 nm and a dichroic ratio of 12.4. This liquid crystal cell was quite excellent in light-stability.

EXAMPLE 2

The procedure of Example 1 was repeated, except that the dye used in Example 1 was replaced with dye No. 4, No. 5, No. 24 or No. 34 shown in the above-mentioned table. Measurement of dichroic ratio gave results of 12.3, 12.2, 12.5 and 12.4, respectively.

EXAMPLE 3

A liquid crystal composition was prepared by dissolving 1% of dye No. 1 shown in the above-mentioned table into a mixed liquid crystal prepared by adding 10% by weight of cholesteryl chloride as a cholesteric liquid crystal material to liquid crystal E 8 as a nematic liquid crystal having a positive dielectric anistropy. The liquid crystal composition thus obtained was poured into a cell which had been treated so as to give a perpendicular orientation or a parallel orientation. In the construction of FIG. 2, this liquid crystal device was colored blue when no voltage was applied thereto, which turned to colorlessness when a voltage of about 15 volts or more was applied, and there was obtained a reflection type display of brightness and high contrast without using polarizer. The cholesteric liquid crystal material used in the mixed liquid crystal is not limited to the above-mentioned cholesteryl chloride, but cholesteryl derivatives and chiral nematic materials of biphenyl type, ester type or the like can also be used similarly.

EXAMPLE 4

The procedure of Example 1 was repeated, except that the dye of Example 1 was replaced with a mixture of dyes No. 34 and No. 2 shown in Table 1. Measurement of dichroic ratio revealed that the dichroic ratio varied in the range of 12.4 to 10.1 depending on the mixing ratio of the two dyes. Liquid crystal composition were prepared by adding 1.0–2.0% by weight of a dye mixture in which the mixing ratio of dye No. 34 was 20–80% and the mixing ratio of dye No. 2 was 80–20% into a liquid crystal mixture, and the liquid crystal cells into which the liquid crystal composition thus obtained was introduced, were subjected to a continuous preservation test for about 1,000 hours in a low temperature environment of −40° C. As a result, the deposition of dye was not observed at all. Thus, liquid crystal cells of high reliability could be obtained.

EXAMPLE 5

(Synthesis of Compound No. 1)

A mixture of 7.5 g of p-n-butylphenol and 0.7 g of potassium hydroxide was heated and dehydrated at 150°–160° C., after which 1.6 g of 1,5-diamino-4,8-dioxy-3,7-dibromoanthraquinone was added and reacted at about 170° C. for 6 hours. Then the reaction mixture was cooled to about 100° C. and discharged into 1% aqueous solution of sodium hydroxide. The deposited crystal was collected by filtration and washed with water.

The crude product was recrystallized from toluene-hexane to obtain 0.9 g of a blue dye (m.p. 245°–248° C.) having the following structural formula:

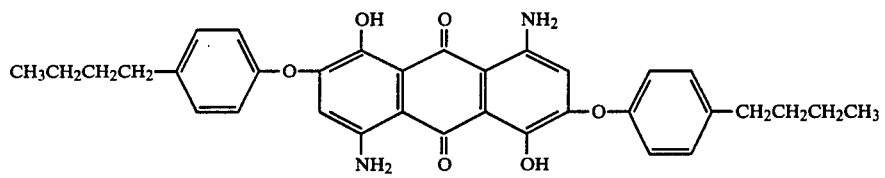

EXAMPLE 6

(Synthesis of Compound No. 6)

A mixture of 6.5 g of 4-hydroxydiphenyl and 0.8 g of potassium hydroxide was heated and dehydrated at about 170° C., after which 5 g of dimethylformamide and 1.6 g of 1,5-diamino-4,8-dioxy-2,7-dibromoanthraquinone were added and reacted at about 170° C. for 6 hours. Then the reaction mixture was cooled to about 100° C. and discharged into 1% aqueous solution of sodium hydroxide. The deposited crystal was collected by filtration and washed with water. The crude product was recrystallized from toluene-hexane to obtain 1.1 g of a blue dye (m.p. 271°–275° C.) having the following structural formula:

EXAMPLE 7

Compound No. 11 having the following structural formula was synthesized by repeating the procedure of Example 6, except that the 1.6 g of 1,5-diamino-4,8-dioxy-2,7-dibromoanthraquinone used in Example 6 was replaced with 1.6 g of 1,8-diamino-4,5-dioxy-3,6-dibromoanthraquinone. In liquid crystal, this dye showed $\lambda_{max}$ of 610 nm and 640 nm.

EXAMPLE 8

Compounds Nos. 2, 7, 34 and 36–39 were synthesized by repeating the procedure of Example 5, except that the 7.5 g of p-n-butylphenol used in Example 5 was replaced with 7.5 g each of the p-substituted phenols shown in Table 2.

On the other hand, compound No. 40 was synthesized by repeating the procedure of Example 7, except that the 6.5 g of 4-hydroxydiphenyl used in Example 7 was replaced with 6.5 g of p-n-amylphenol shown in Table 2.

The compounds thus obtained are summarized in Table 2. In Table 2, the values of $\lambda_{max}$ are those measured in liquid crystal (BDH Chemicals; E 8).

TABLE 2

| | | Position of substituent | | | Characteristic properties | |
|---|---|---|---|---|---|---|
| No. | Starting phenol | NH$_2$ | OH | —O—⌬—R | R | m.p. (°C.) | $\lambda_{max}$ (nm) |
| 2 | HO—⌬—C$_9$H$_{19}$ *1 | 1,5 | 4,8 | 3,7 | —C$_9$H$_{19}$ | 125–130 | 572, 610 |
| 7 | HO—⌬—CH$_2$—⌬ | 1,5 | 4,8 | 3,7 | —CH$_2$—⌬ | 258–261 | 573, 612 |
| 34 | HO—⌬—C$_5$H$_{11}$—n | 1,5 | 4,8 | 3,7 | —C$_5$H$_{11}$—n | 235–237 | 572, 610 |
| 36 | HO—⌬—C$_{12}$H$_{25}$ *2 | 1,5 | 4,8 | 3,7 | —C$_{12}$H$_{25}$ | 68–72 | 572, 610 |

TABLE 2-continued

| No. | Starting phenol | Position of substituent NH$_2$ | OH | —O—⟨⟩—R | R | Characteristic properties m.p. (°C.) | $\lambda_{max}$ (nm) |
|---|---|---|---|---|---|---|---|
| 37 | HO—⟨⟩—C$_8$H$_{17}$—t | 1,5 | 4,8 | 3,7 | —C$_8$H$_{17}$—t | 176–180 | 572, 610 |
| 38 | HO—⟨⟩—⟨⟩ | 1,5 | 4,8 | 3,7 | —⟨⟩ | 314–317 | 573, 612 |
| 39 | HO—⟨⟩—NH—⟨⟩ | 1,5 | 4,8 | 3,7 | —NH—⟨⟩ | 318–321 | 573, 612 |
| 40 | HO—⟨⟩—C$_5$H$_{11}$—n | 1,8 | 4,5 | 3,6 | —C$_5$H$_{11}$—n | 116–119 | 609, 638 |

(Notes)
*[1] The nonyl group is a trimer of propylene.
*[2] The dodecyl group is a tetramer of propylene.

What is claimed is:

1. An anthraquinone compound represented by the following general formula:

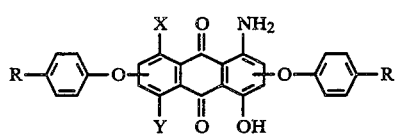

wherein one of X and Y is amino group and the other is hydroxyl group; and R is alkyl group having 3 to 9 carbon atoms, lower alkoxy, lower alkylthio, phenyl, phenyl-substituted lower alkyl, phenyloxy, phenylthio, phenyl-substituted lower alkyloxy, halogen, or a group

in which $R_1$ and $R_2$ are hydrogen, lower alkyl, or phenyl, wherein the benzene ring in substituents R, $R_1$ and $R_2$ is unsubstituted or substituted with a lower alkyl or a lower alkoxy and the alkyl chain in substituents R, $R_1$ and $R_2$ is unsubstituted or substituted with a lower alkoxy.

2. An anthraquinone compound according to claim 1 which is represented by the following general formula:

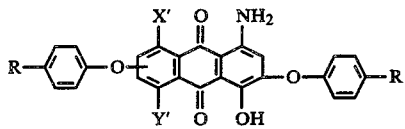

wherein R is as defined in claim 1; one of X' and Y' is amino group and the other is hydroxyl group; and the group

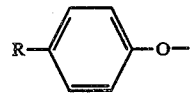

substitutes at the ortho position of the hydroxyl group.

3. A compound according to claim 1, wherein R in said general formula is an alkyl group having 3–9 carbon atoms.

4. A compound according to claim 1, wherein R in said general formula is a lower alkoxy group.

* * * * *